(12) United States Patent  (10) Patent No.: US 9,141,393 B2
Kraft et al.  (45) Date of Patent: Sep. 22, 2015

(54) BUSINESS CONTENT AUTHORING AND DISTRIBUTION

(75) Inventors: Emil Burns Kraft, Bellevue, WA (US); Jacob Thomas Milnes, Woodinville, WA (US)

(73) Assignee: EnterCalo, Inc., Bellevue, WA (US)

( * ) Notice: Subject to any disclaimer, the term of this patent is extended or adjusted under 35 U.S.C. 154(b) by 227 days.

(21) Appl. No.: 13/299,259

(22) Filed: Nov. 17, 2011

(65) Prior Publication Data

US 2013/0132927 A1   May 23, 2013

(51) Int. Cl.
  *G06F 9/44*  (2006.01)
  *G06F 17/24*  (2006.01)

(52) U.S. Cl.
  CPC .. *G06F 9/44* (2013.01); *G06F 8/30* (2013.01); *G06F 17/246* (2013.01)

(58) Field of Classification Search
  USPC ........................................................ 717/106
  See application file for complete search history.

(56) References Cited

U.S. PATENT DOCUMENTS

| 5,721,847 | A | * | 2/1998 | Johnson | 715/786 |
| 6,023,715 | A | * | 2/2000 | Burkes et al. | 715/207 |
| 6,470,349 | B1 | * | 10/2002 | Heninger et al. | 717/115 |
| 6,519,764 | B1 | * | 2/2003 | Atkinson et al. | 717/120 |
| 7,010,779 | B2 | | 3/2006 | Rubin et al. | |
| 7,490,314 | B2 | * | 2/2009 | Yuknewicz et al. | 717/105 |
| 8,346,777 | B1 | * | 1/2013 | Auerbach et al. | 707/741 |
| 8,751,462 | B2 | * | 6/2014 | Huang et al. | 707/692 |
| 2003/0159132 | A1 | * | 8/2003 | Barnett et al. | 717/124 |
| 2003/0226105 | A1 | | 12/2003 | Waldau | |
| 2004/0210822 | A1 | * | 10/2004 | Kotler et al. | 715/500 |
| 2005/0044496 | A1 | * | 2/2005 | Kotler et al. | 715/538 |
| 2005/0050088 | A1 | | 3/2005 | Kotler et al. | |
| 2005/0188352 | A1 | | 8/2005 | Jager et al. | |
| 2008/0209392 | A1 | * | 8/2008 | Able et al. | 717/105 |
| 2008/0244508 | A1 | * | 10/2008 | Mantuano et al. | 717/106 |
| 2009/0089696 | A1 | * | 4/2009 | Miller et al. | 715/771 |
| 2010/0077378 | A1 | * | 3/2010 | Maguire et al. | 717/106 |
| 2010/0146491 | A1 | * | 6/2010 | Hirano et al. | 717/137 |
| 2010/0174981 | A1 | | 7/2010 | Jiang et al. | |
| 2012/0209853 | A1 | * | 8/2012 | Desai et al. | 707/741 |
| 2012/0317525 | A1 | * | 12/2012 | Chapman | 716/102 |
| 2013/0019225 | A1 | * | 1/2013 | Peters et al. | 717/106 |

OTHER PUBLICATIONS

Baker, "A Program for Identifying Duplicated Code", Computing Science and Statistics, 1993.*
R"onnau et al., "Towards XML Version Control of Office Documents", ACM, 2005.*
International Search Report and Written Opinion for PCT/US2012/065701 filed Nov. 16, 2012, mailed Mar. 29, 2013, 10 pages.

* cited by examiner

*Primary Examiner* — Anna Deng
*Assistant Examiner* — Junchun Wu
(74) *Attorney, Agent, or Firm* — Perkins Coie LLP

(57) ABSTRACT

Technology is described for authoring and distributing business content. In various embodiments, the technology can receive a wordprocessing document, the wordprocessing document including a script tag and an instruction within the script tag, the instruction identifying at least the one named cell or region; and produce source code corresponding to the received wordprocessing document.

19 Claims, 16 Drawing Sheets

Some Health Plan
1 Something Way
New York, New York 10111

| CHECK NUMBER |
| --- |
| 100 |
| CHECK DATE |
| 01-Aug-2011 |

| Payable To | Memo | Trans Date | Amount |
| --- | --- | --- | --- |
| Some Group | 2011 MLR Rebate | 08/01/2011 | 5.73 |

FOR QUESTIONS, CALL (888) 888-8888     TOTAL  $    5.73

DETACH AND RETAIN THIS STATEMENT

- - - - - - - - - - - - - - - - - - - - - - - - - - - - - - - - - - - - - - - - -

Some Health Plan                                              100
1 Something Way
New York, New York 10111

DATE:    01-Aug-2011
VOID AFTER 180 DAYS

PAY     Five and 73/100 Dollars************************************************

$************5.73

TO THE      Some Group
ORDER       6047 173rd Ave SE
OF          Bellevue, WA 98006-3456

Some Health Plan
1 Something Way
New York, New York 10111<?c# string cn = GetCN(); ?>

| CHECK NUMBER |
| <?c# Print(cn); ?> |
| CHECK DATE |
| <?c# Print(DateTime.Now.ToString("dd-MMM-yyyy")); ?> |

| Payable To | Memo | Trans Date | Amount |
|---|---|---|---|
| <?c# if (Cell("Group" + "Subscriber" + "Indicator") == "G") { Print(Cell("GroupName")); } else { Print(Cell("ContactFullName")); } ?> | 2011 MLR Rebate | <?c# Print(DateTime.Now.ToString("MM/dd/yyyy")); ?> | <?c# Print(Cell("AdjustedRebate").ToString("$,##0.00")); ?> |

FOR QUESTIONS, CALL (888) 888-8888        TOTAL   $<?c# Print(Cell("

DETACH AND RETAIN THIS STATEMENT

---

Some Health Plan
1 Something Way
New York, New York 10111

<?c# Print(cn); ?>

DATE:   <?c# Print(DateTime.Now.ToString("dd-MMM-yyyy")); ?>
VOID AFTER 180 DAYS

PAY    <?c# Print(currencyToText(Cell("AdjustedRebate")).PadRight(81, '*')); ?>

$<?c# Print(Cell("AdjustedRebate").ToString("$,##0.00").PadLeft(13, '*')); ?>

*FIG. 11*

BUSINESS CONTENT AUTHORING AND DISTRIBUTION

BACKGROUND

Business people commonly employ office productivity tools, e.g., word processing tools, spreadsheet tools, and other tools, to author business documents. These tools offer various capabilities to merge data with content. As an example, using a "mail merge" feature, business people are able to create templates for letters using a word processing tool, replace fields in the letter with data from a spreadsheet, and print multiple letters wherein each letter is addressed to a different person at a different address. The "mail merge" feature may also be used to print labels or envelopes.

Information technology professionals at businesses can create large and complex systems to automate similar tasks. As an example, when a financial institution sends statements to customers, a complex information technology system may retrieve financial data pertaining to each customer and generate documents including the retrieved financial data that are then mailed to customers.

Conventionally, business people employ office productivity tools to "model" relationships between data. The business people may also employ the office productivity tools to create charts or other visual aids to meaningfully convey the data in a form that is more readily understood than studying complex tables of numbers. However, office productivity tools are generally not suitable for producing large numbers of documents at a server. As examples, there may be business limits imposed by license agreements, technical limits because the office productivity software was not designed to be executed as a server tool, or other reasons. Moreover, the information technology professionals may be more comfortable using development tools and programming languages so that their applications can "scale" to use by hundreds or even thousands of users concurrently.

U.S. Pat. No. 7,010,779 describes a technique for generating code from a spreadsheet document. A user can input various formulae and data into a spreadsheet document, and the described technique can emit source code that information technology professionals can combine with other applications to execute the input formulae and/or employ the input data.

However, the information technology professionals may still need to perform sophisticated programming to generate adequate business output for distribution.

BRIEF DESCRIPTION OF THE DRAWINGS

FIG. 10 is an output diagram illustrating an example of output emitted by the technology in some embodiments.

FIG. 11 is an input diagram illustrating an example of a portion of a wordprocessing document that the technology may receive to emit the output illustrated in FIG. 10.

DETAILED DESCRIPTION

Figure 1:
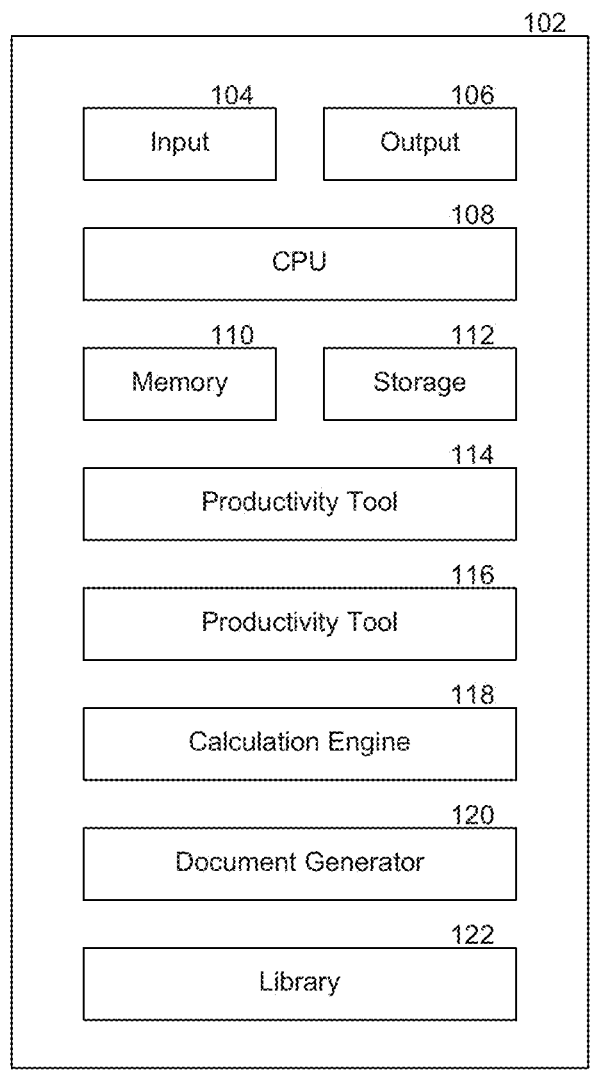
FIG. 1 is a block diagram illustrating components employed by a business content authoring and distribution technology ("the technology") in various embodiments.

Technology is described for business content authoring and distribution. In various embodiments, the technology can evaluate a spreadsheet document and/or a wordprocessing document, and emit source code in one or more computer programming languages (e.g., C#, Java, C++, etc.) based on the contents therein. The spreadsheet document can include formulae, charts, rules, data, formatting, etc. The wordprocessing document can include information and references to data fields, e.g., fields to be computed or inserted from the spreadsheet. The technology can extract data structures from the spreadsheet document, tokenize, and/or convert the extracted information into canonical data. The technology can perform a lexical analysis of the formulae, e.g., to tokenize the cell formulae. The technology can generate a formula signature for each cell and, based on the frequency of each formula signature, reduce the size of the generated source code by parameterizing those formula signatures which repeat for multiple cells of the spreadsheet document. Based on these analyses and parameterizations, the technology can generate source code that replicates the functionality of the spreadsheet, but in an optimized manner due to using a reduced variety of functional calls and the parameterization of those functional calls that repeat. Additionally, the technology can create the data files containing relevant cell data, e.g., data that is constant. The generated source code can then be employed, e.g., in combination with other source code, to produce an application, a service, a web service, etc. In some embodiments, the technology may emit source code in a computer programming language that guarantees the order of evaluating parameters (e.g., C#) so that the emitted source code suitably performs behavior consistent with the design of the spreadsheet or wordprocessing productivity tools (also referred to as "productivity applications"), e.g., when such tools are used to open the spreadsheet document or wordprocessing document used to generate the source code. This can reduce code. In other embodiments, other computer programming languages may be used.

In various embodiments, the technology includes a Business Content Server (BCS). The compiled source code can be executed on a BCS. Typically, large amounts of input data resides on the BCS, thereby making the execution of the compiled source code highly efficient for producing large amounts of output data. Additionally, using the compiled source code on the BCS can overcome limitations regarding the size of the input data, e.g., associated with spreadsheet documents. A GUI can be created to execute batch processes based on the compiled source code. Multiple users can execute the compiled source code using the same or different input databases. The execution of the compiled source code can generate files containing XML, WSDL, SOAP, SQL, portable document format ("PDF"), or XSD format. Some examples of the files are letters, e-mails, bank checks, instruction manuals, etc.

In various embodiments, the compiled source code can be hosted by and executed via a BCS. A GUI can be created to execute batch processes based on the compiled source code. Multiple users can concurrently execute the compiled source code across a user-specified number of instances of the compiled source code using the same or different input databases. A web service can be created to execute transactional processes based on the compiled source code. Typical spreadsheet document constraints of concurrency and reduced performance are eliminated by using the compiled source code for calculation and document generation. Some examples of the generated files are letters, e-mails, bank checks, instruction manuals, etc.

In various embodiments, the technology can add code to a generated source code library, e.g., whenever source code is emitted that is not already in the source code library. In various embodiments, a runtime library may be statically or dynamically linked to the generated source code library to provide additional functionality, e.g., after generating object code using the source code library.

In various embodiments, the wordprocessing document may include a functional link to a spreadsheet document from which input is received. Then, when input data changes in the generated source code corresponding to the spreadsheet document, source code generated based on the wordprocessing document can base its output using the changed input data.

Several embodiments of the facility are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement the disclosed technology. In addition, the data structures and message structures may be stored or transmitted via a data transmission medium, such as a signal on a communications link. Various communications links may be used, such as the Internet, a local area network, a wide area network, or a point-to-point dial-up connection.

A user can specify data structures in a spreadsheet document, e.g., using range names. A range name specifies a set of cells in the spreadsheet document. The technology can read the contents of the cells, metadata (e.g., comments) associated with the specified ranges and nearby cells, and then determine how many different input and output schemas may be needed and data structures for one or more of the input and output schema. Input schemas can be comprised of input cells and input tables. Input cells can specify scalar data and input tables can specify vector data. Output schemas can be comprised of output cells, output tables, and output charts. Output cells can specify scalar data, output tables can specify vector data, and output charts can show a visual representation of data (whether scalar or vector; or input our output).

A user may also specify validation schemas. A validation schema can specify formulae or other rules that the technology can employ to automate validation of input or output data. As an example, the technology may generate validation reports based on the validation schemas.

In various embodiments, the input data may be received from various sources (e.g., in a web service call, XML or SOAP message, etc.), inserted into a worksheet document for processing, etc. The input data can then be processed, e.g., to produce output data. Once source code is generated, e.g., for a wordprocessing document, the native document need no longer be used. For purposes of simplicity, however, they may still be referred to as wordprocessing documents.

FIG. 1 is a block diagram illustrating components 102 employed by a business content authoring and distribution technology ("the technology") in various embodiments. The components 102 can include an input component 104 and an output component 106. Examples of input components 104 can include, e.g., keyboard, mouse, stylus, voice, touch screen, etc. Examples of output components 106 can include, e.g., display monitors, printers, projectors, etc. One or more central processing unit (CPU) components 108 can perform some or all of the processing implemented by the technology. A memory component 110 and/or a storage component 112 can store input data, intermediate data, output data, libraries, object code, source code etc. The technology may make use of one or more productivity tools 114, e.g., spreadsheet applications, wordprocessing applications, presentation applications, publishing applications, etc. The technology can include a calculation engine 118 to perform some of the computations described herein. The technology can include a document generator 120 to produce documents in various formats, e.g., XML, PDF, wordprocessing document, spreadsheet document, text document, etc. the technology may have also employ a library component 122, e.g., to store libraries of code furnished by the technology, generated by the technology, etc.

Those skilled in the art will appreciate that the components illustrated in FIG. 1 and described above, and in each of the block diagrams discussed below, may be altered in a variety of ways. For example, additional components can be added, components can be removed or modified, etc.

Figure 2:
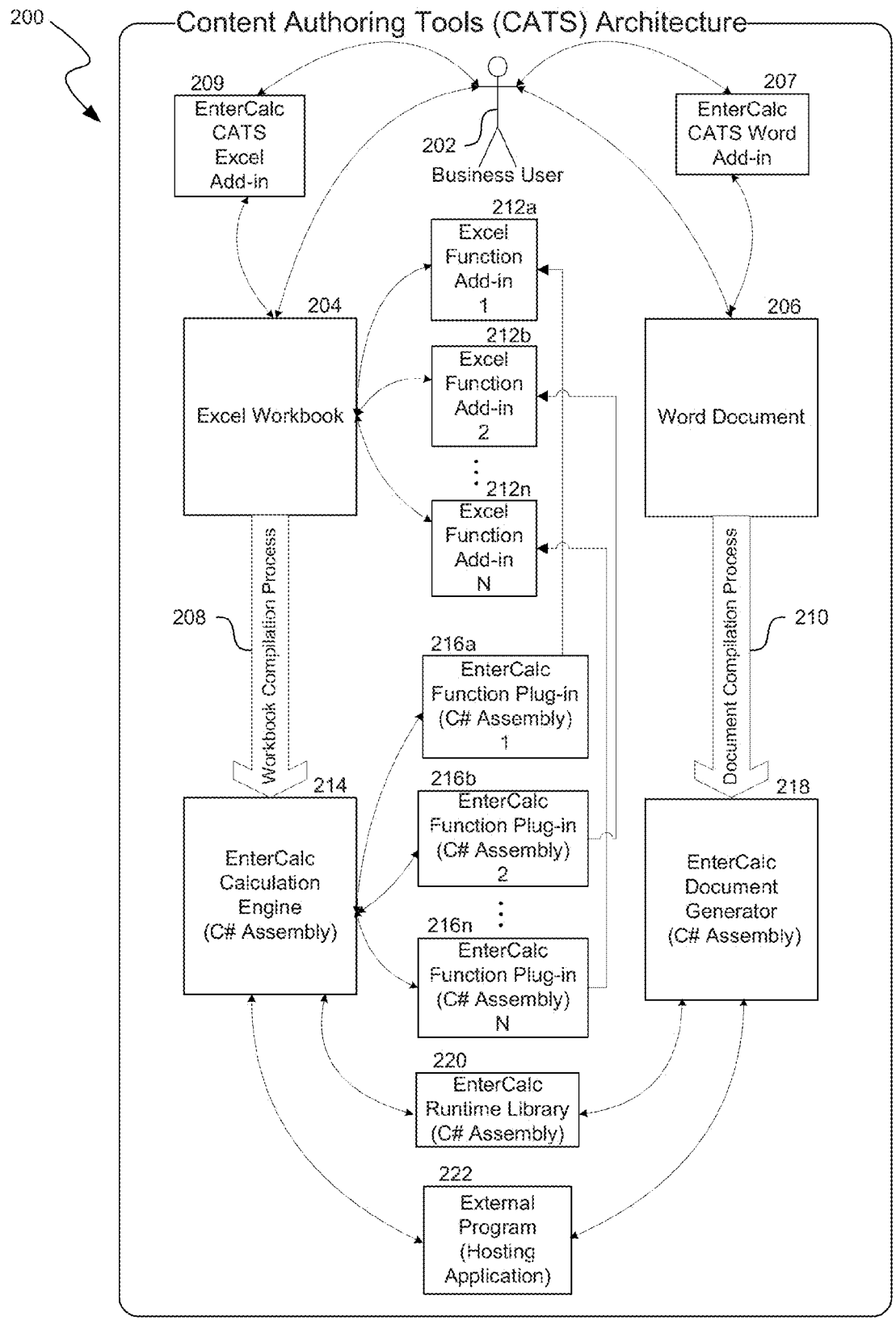
FIG. 2 is a block diagram illustrating components employed by the technology in various embodiments.

FIG. 2 is a block diagram illustrating components 200 employed by the technology in various embodiments. A business user 202 can interact with the technology using various components 200. As an example, the user may provide input data, formulae, rules, etc. using a productivity tool, e.g., a spreadsheet application. An example of a spreadsheet application is MICROSOFT EXCEL. Other examples of spreadsheet applications also exist. The business user 202 may employ the productivity tool to create a spreadsheet document ("workbook"). The business user 202 may also employ a second productivity tool, e.g., a wordprocessing application to provide additional input. An example of a wordprocessing application is MICROSOFT WORD. Other examples of wordprocessing applications also exist. The technology may employ the additional input specified in the wordprocessing document, e.g., to produce output documents.

The technology can provide components that the technology employs in conjunction with the productivity tools to generate source code. In various embodiments, the technology can provide an add-in for one or more of the productivity tools with which the technology is configured to operate. In the illustrated embodiment, the technology provides an add-in 209 for a spreadsheet application and an add-in 207 for a wordprocessing application. The technology may employ an add-in's 207 and 209 to interact with the productivity tools, e.g., to identify input, retrieve data, add data, modify data, etc. The technology may also provide add-ins 212a-n to interact with functions provided by the spreadsheet application. Such applications can include one or more built-in functions as well as user added functions. The add-ins 212a-n can correspond to one or more of these functions that enable the technology to produce source code based on these functions.

The technology can employ a compilation process 208 that is described in detail further below to emit source code, intermediate language code, or object code, e.g., to be executed by a calculation engine 214. The emitted code can employ plug-ins 216a-n, that provide functionality identified by add-ins 212a-n corresponding to one or more functions. In various embodiments, the plug-ins 216a-n can be implemented as source code, intermediate language code, or object code, e.g., as C# assemblies. As is known in the art, a C# assembly is code generated in an intermediate language.

The technology can employ a compilation process 210 that is described in detail further below to emit source code, intermediate language code, or object code, e.g., to be executed by a document generator 218.

The calculation engine 214 and the document generator 218 can employ a runtime library 220 to provide functionality, e.g., to an external program (e.g., a hosting application) 222 based on the input spreadsheet document and/or wordprocessing document. In various embodiments, the runtime library provides common functionality for generated calculation engines, generated document generators. It can also provide interface functionality for external hosting programs.

Thus, an information technology professional can receive one or more documents from business professionals (e.g., spreadsheet documents, wordprocessing documents, presentation documents, etc.) and employ the technology to produce source code, intermediate language code, or object code based on the received documents. The emitted code can then be integrated with the BCS or an external program, e.g., for execution at a server computing device (e.g., as part of a hosted service that provides a batch process interface, web service or other service that provides a transactional interface, etc.).

Figure 3:
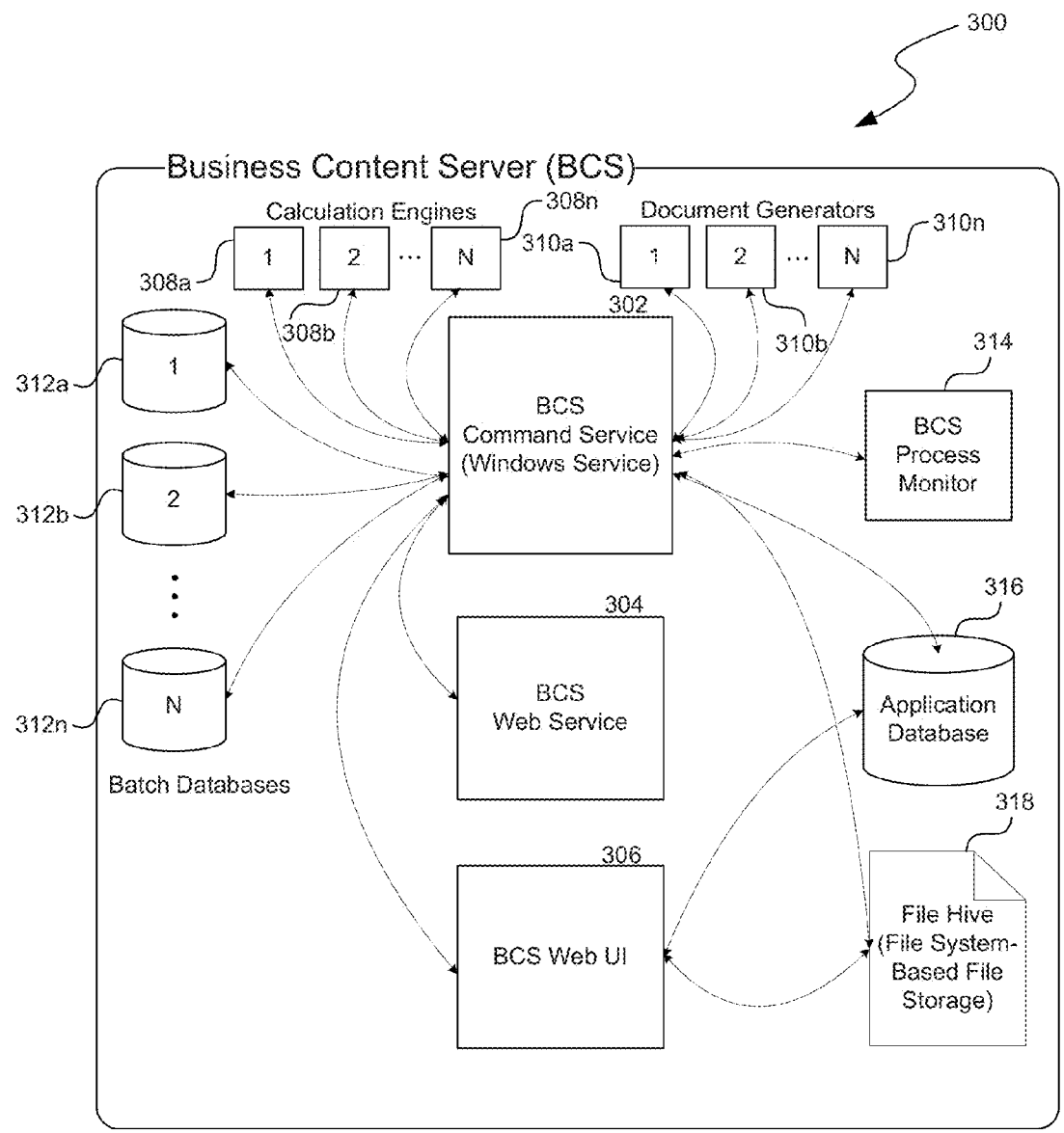
FIG. 3 is a block diagram illustrating components employed by the technology in various embodiments.

FIG. 3 is a block diagram illustrating components 300 employed by the technology in various embodiments. The components 300 can include one or more calculation engines 308a-308n (e.g., similar to calculation engine 214 described above in relation to FIG. 2), one or more document generators 310a-310n (e.g., similar to document generator 218 described above in relation to FIG. 2). The components 300 can also include databases 312a-312n, e.g., to store input data, intermediate data, or output data.

The technology can include a command service component 302, a web service component 304, and a user interface component 306. The web service component 304 and the user interface component 306 can interact with the command service component 302, to provide functionality associated with the previously emitted code. The command service component 302 can employ the calculation engines 308a-n and document generators 310a-n, e.g., to compute output data results based on received input data and generate documents. The command service component 302 can also employ databases 312a-n, e.g., to retrieve data to be provided to the calculation engines 308a-n, store computed outputs and output document references generated by the document generators 310a-n, etc. The web service component 304 can provide a web service interface to the command service component 302, e.g., so that other applications can employ a web service to interact with the command service component 302. The user interface component 306 can provide a user interface to the command service component 302, e.g., so that users can interact with the command service component 302 directly via the user interface. In other embodiments, the command service component 302 can be controlled via other interfaces, e.g., command line, web service, Web page, etc.

In some embodiments, the command service component 302 can be a server daemon (e.g., a WINDOWS service), and can include calculation engines, document generators, and other components. The command service component 302 can manage lifetime of calculation engine assemblies and document generator assemblies; and route calculation and document generation requests to the pertinent assembly.

In some embodiments, the command service component 302 can enable administrators to interact with the technology, e.g., to create a new service, add an email account (e.g., to enable the technology to send email messages), manage permissions, etc.

A process monitor component 314 can monitor the command service component 302, e.g., to identify performance. An application database component 316 and/or a file storage component 318 can store components, assemblies, code, or other data associated with applications.

Figure 4:
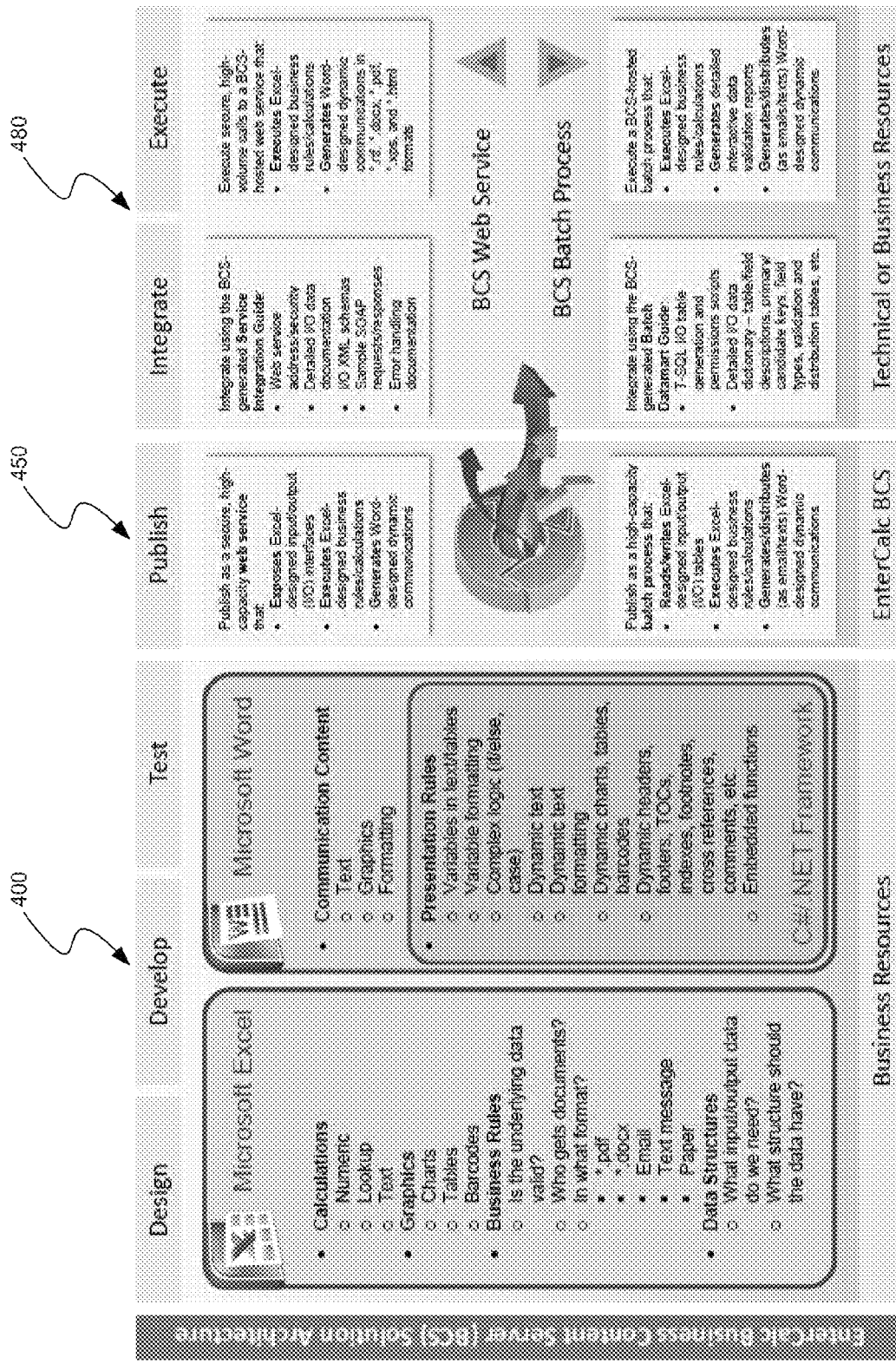
FIG. 4 is a conceptual diagram illustrating concepts relevant to the technology in various embodiments.

FIG. 4 is a conceptual diagram illustrating concepts relevant to the technology in various embodiments. The conceptual diagram illustrates multiple design, develop, and test concepts 400. In the illustrated embodiment, the concepts employ a spreadsheet productivity tool (e.g., MICROSOFT EXCEL) and a wordprocessing productivity tool (e.g., MICROSOFT WORD). In other embodiments, however, the concepts can employ other productivity tools (e.g., other types of tools or similar tools commercialized by vendors other than MICROSOFT). The spreadsheet productivity tool can be employed to provide various types of data, e.g., numeric data; make various computations; generate graphical representation of data; evaluate or enforce business rules; and provide indications or hints of types of data that may be needed. The wordprocessing productivity tool can be employed to communicate the data provided by a spreadsheet document and also to provide additional functionality, e.g., formatting of the output that was not provided by the spreadsheet document. The communications can be in textual or graphical form. A wordprocessing document can include dynamically generated content and static content. The dynamically generated content can be generated by the wordprocessing productivity tool or can be imported (e.g., automatically) from a different tool or application (e.g., the spreadsheet productivity tool). Thus, the technology enables a user (e.g., a businessperson) to use various productivity tools to design, develop, and test a portion of an overall application that the businessperson is capable of contributing significantly towards without significant assistance from information technology professionals.

The conceptual diagram also illustrates multiple publish concepts 450. In various embodiments, the technology can publish document generation service and calculation services as web services, as batch processes (e.g., to create documents for transmitting or mailing), etc.

The conceptual diagram also illustrates multiple integration and execution concepts 480. The integration and execution concepts 480 can be employed to produce various types of output, e.g., publish as XML, PDF, text files, native documents (e.g., MICROSOFT WORD documents), and other types of documents.

Figure 5:
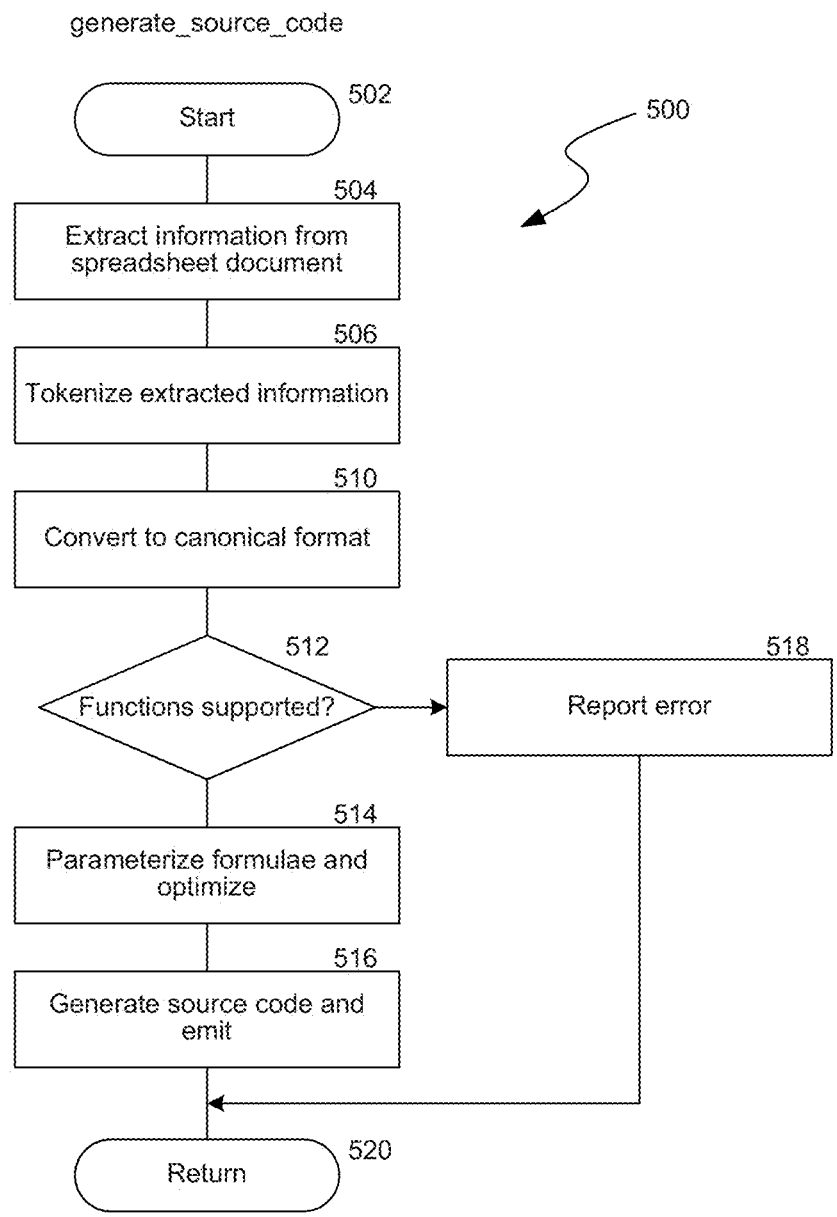
FIG. 5 is a flow diagram illustrating a routine invoked by the technology in various embodiments, e.g., to generate source code based on a spreadsheet document.

FIG. 5 is a flow diagram illustrating a routine 500 invoked by the technology in various embodiments, e.g., to generate source code based on a spreadsheet document. The routine 500 begins at block 502. At block 504, the routine extracts information from a spreadsheet document. In various embodiments, the routine can extract constant data stored in a spreadsheet document's cell, formulae, protection attributes, metadata (e.g., at the cell or worksheet level), charts, schema information, named range information, etc. The routine can also provide a detailed report outlining whether or not the extraction (or aspects thereof) was successful.

At block 506, the routine tokenizes the extracted information. Tokenization can include assigning tokens to the extracted information (e.g., for each named range, attribute, etc.) The tokenization assists in converting the spreadsheet document into an in-memory canonical form for optimization of formulae and data, e.g., by identifying and eliminating duplicates, identifying and prioritizing dependencies, etc. Thus, the routine performs a lexical analysis, e.g., to assist in tokenizing formulas contained in cells.

At block 510, the routine converts the information to a canonical format. In various embodiments, the technology can convert cell ranges, cell references, and worksheets into a canonical format. By doing so, the technology can take optimization steps, e.g., by identifying duplicates.

At decision block 512, the routine determines whether functions provided by a productivity tool (e.g., a spreadsheet application) and utilized by the spreadsheet document are supported by a runtime function library the technology provides. If the utilized functions are supported by the runtime function library, the routine continues at block 514. In various embodiments, the technology determines whether utilized functions that are not supported by the runtime function library are available by an add-in (e.g., add-ins 212*a-n* illustrated in FIG. 2 and described above). Otherwise, the routine continues at block 518. At block 514, the routine parameterizes formulae in the spreadsheet document and optimizes source code. The parameterization can include generating formula signatures cells (e.g., each cell containing a formula) and, based on the occurrence frequency of each formula signature, reducing code size. The code size can be reduced, e.g., by eliminating duplicates, employing a common function with varying parameters (instead of one instance per function), etc.

At block 516, the routine generates source code and emits the generated source code, and continues at block 520. The source code generation can include building source code files, project files, and constant data files. The technology can also emit a summary document with source code generation statistics. The summary document can be detailed, graphically-rich, and interactive. Examples of information included in the summary document can be, e.g., number of lines of code, number of functions, correspondences between source code and source in the spreadsheet document or wordprocessing document, etc. Worksheet source code files can contain unique formulas as functions, e.g., with parameters for cell references (e.g., for other formulae, cell constant data, etc.). In some embodiments, named range information for references (to cells, ranges, etc.) and worksheet information for references may be determined at runtime. The source code generation can also include identifying schema information, charts, cell dependencies, and layouts. As is known in the art, worksheet cells may reference other worksheet cells. The technology evaluates some dependences during code generation, but may postpone evaluation of other dependencies until runtime.

At block 518, the routine returns an error and continues at block 520. At block 520, the routine returns.

Those skilled in the art will appreciate that the logic illustrated in FIG. 5 and described above, and in each of the flow diagrams discussed below, may be altered in a variety of ways. For example, the order of the logic may be rearranged, substeps may be performed in parallel, illustrated logic may be omitted, other logic may be included, etc.

In various embodiments, the technology provides a runtime function library (referenced above in relation to decision block 512) that provides an implementation of functions or other features of the spreadsheet productivity tool. The runtime function library can also provide an implementation of data structures and functions employed at runtime; functions to enable charts and histogram data to be reconstituted into images; and interface definitions for making calculation requests.

The technology can also be supplemented by 3rd party add-in library functions.

Figure 6:
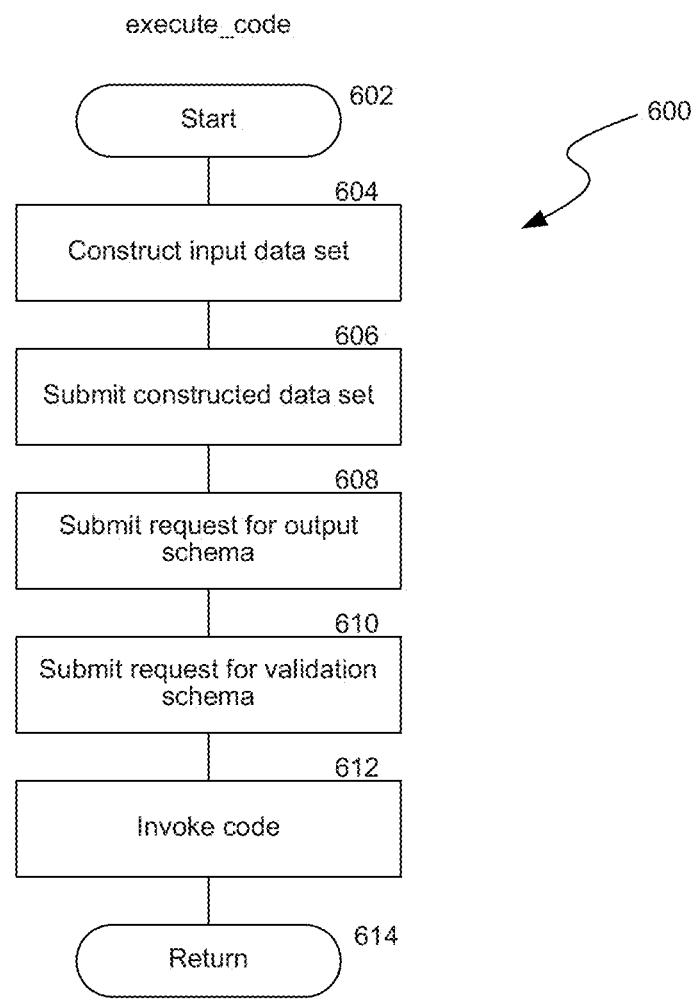
FIG. 6 is a flow diagram illustrating a routine invoked by the technology in various embodiments, e.g., to prepare to execute previously generated source code.

FIG. 6 is a flow diagram illustrating a routine 600 invoked by the technology in various embodiments, e.g., to prepare to execute previously generated source code (e.g., emitted into a generated library). The routine 600 begins at block 602.

At block 604, the routine constructs input data set. The data structure of the input data set may be specified in a runtime library; and the schema of the input data set may be specified by one or more of input schemas in the spreadsheet document that provides the pertinent input. Some examples of the types of data structures that can be extracted from the spreadsheet are: constant cell data, cell formulas, charts, graphs, histograms, cell dependencies, layout information, embedded schema information, named range information, cell protection attributes, individual sheet meta-data, and spreadsheet meta-data.

At block 606, the routine submits the input data set, e.g., to a generated library. At block 608, the routine submits a request for one or more an output schema, or portions thereof. At block 610, the routine submits a request for one or more validation schema, or portions thereof. The output schema and/or the validation schema may be defined in the spreadsheet document that provides the pertinent input.

At block 612, the routine invokes the previously generated code. At block 614, the routine returns.

Figure 7:
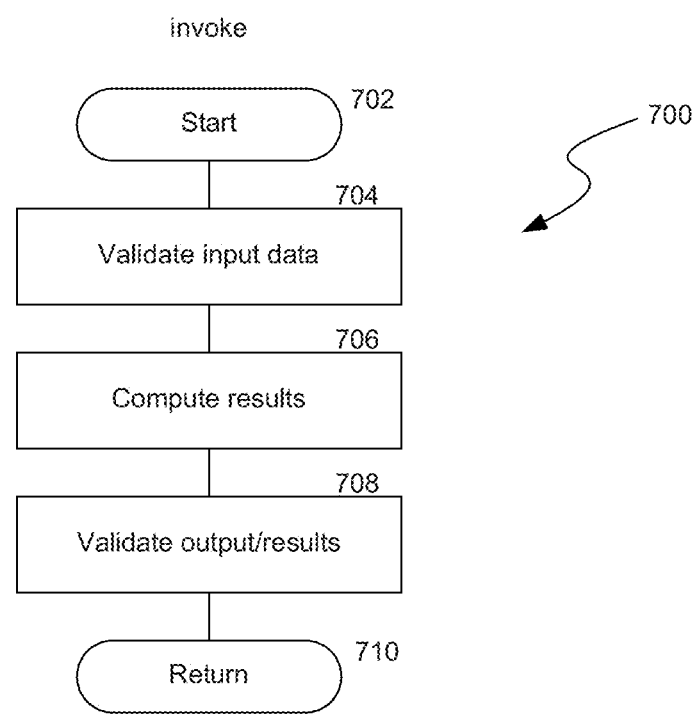
FIG. 7 is a flow diagram illustrating a routine invoked by the technology in various embodiments, e.g., to invoke previously generated source code.

FIG. 7 is a flow diagram illustrating a routine 700 invoked by the technology in various embodiments, e.g., to invoke previously generated source code. The routine 700 begins at block 702.

At block 704, the routine validates input data. The runtime library and the generated library can validate the input data set, e.g., based on validation rules specified in a spreadsheet document that provides the pertinent input.

At block 706, the routine computes results. The results may be computed by a runtime library and a generated library, e.g., to compute results for cells, tables, charts, histograms, etc. In various embodiments, the technology may compute results for cells that are referenced by other cells. The generated library may manage cell recursion depth so as to prevent stack overflow problems. In some embodiments, if a stack overflow is imminent (e.g., by evaluation of a cell recursion depth), the technology may suspend recursion and compute intermediate results.

Constant cell data may be loaded so that only one copy exists in memory. Calculation requests may temporarily override the constant cell data.

At block 708, the routine validates output and/or results. The routine returns at block 710.

In some embodiments, the technology ensures that plug-in functions employed by the generated code are installed and loaded at runtime, e.g., dynamically.

Figure 8:
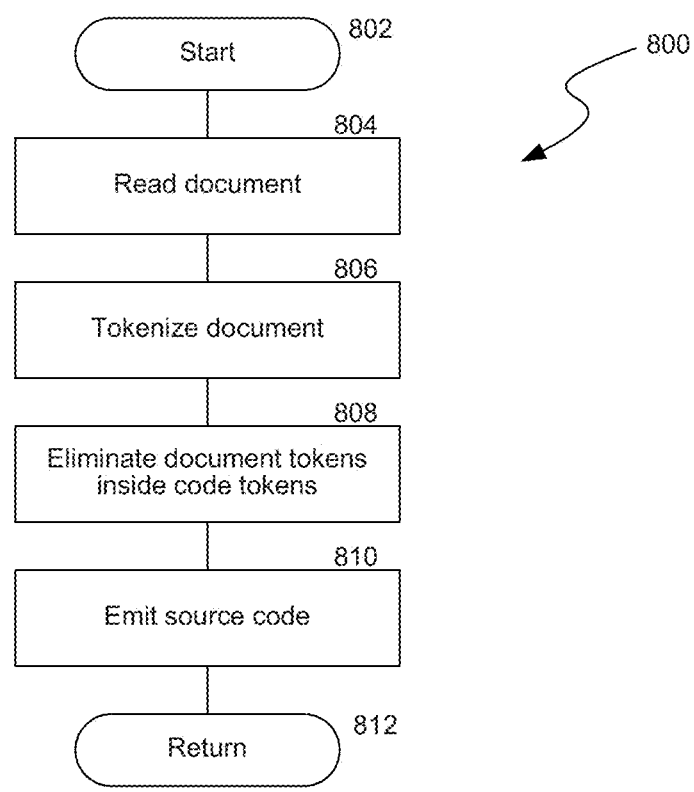
FIG. 8 is a flow diagram illustrating a routine invoked by the technology in various embodiments, e.g., to generate source code based on a wordprocessing document.

FIG. 8 is a flow diagram illustrating a routine 800 invoked by the technology in various embodiments, e.g., to generate source code based on a wordprocessing document. The routine 800 begins at block 802.

At block 804, the routine reads a wordprocessing document. In various embodiments, the technology can read various types of wordprocessing documents, e.g., native wordprocessing documents, rich text files, plain text files, XML files, etc. The wordprocessing document may have embedded therein instructions (e.g., in a computer programming language, C#, etc.). The technology can convert these instructions into general purpose programming language, e.g., by generating a code library. The code library can be employed by other applications.

At block 806, the routine tokenizes the read wordprocessing document. The technology can convert the wordprocessing document into code tokens and document tokens. Code tokens within one script instruction can be formed into one contiguous code token.

At block 808, the routine eliminates document tokens inside code tokens. Document tokens that are fully contained within a code token can be eliminated (e.g., to optimize the source code or because they have no bearing on the appearance of output documents).

At block 810, the routine emits source code. Document tokens can be translated into print code. Code tokens can be split into types, main control code and class-level code (e.g., methods, properties, embedded classes, etc.) In various embodiments, the technology may emit source code, debug information, and a code library (e.g., an assembly). Separate source code can exist for each document type within a library. The technology can also emit a summary document with source code generation statistics. The summary document can be detailed, graphically-rich, and interactive. Examples of information included in the summary document can be, e.g., number of lines of code, number of functions, correspondences between source code and source in the spreadsheet document or wordprocessing document, etc.

At block 812, the routine returns.

In various embodiments, the generated code can be compiled into a generated code library, e.g., using a conventional code compiler. A runtime library may be statically linked to the generated library. The runtime library can provide an interface definitions for making document generation requests (e.g., to the generated code library); functions to produce charts and/or histograms; and functions and data structures to hold and manipulate input data.

At runtime, a calling program can construct an input data set and submit the input data set to the generated code library. The generated library can generate an output document based on the input data; script logic embedded in the wordprocessing document; and literal document information. The script in the wordprocessing document can support various script languages and instructions; operators; functions; data, etc. The generated library may then identify a location where the output document is stored, e.g., by providing a uniform resource locator, file path and file name, etc.

The technology can distribute generated output documents via email, text messaging, printing to a physical printer, posting to a web site, storing at a file server, etc. The generation and the distribution methods and parameters can be based on calculated outputs. As an example, code (e.g., script code) in the wordprocessing document may specify that a refund check should only be generated if an account balance has been more than $5.00 for the last 3 months and there has been no activity in the account. As another example, code may specify to send an email to a customer's email address (located in an identified output cell of the spreadsheet document) if the email address is valid, otherwise print it to an identified printer, e.g., for mailing.

The instructions in the spreadsheet document can support various script languages and instructions; operators; functions; data, etc. The data can be of various types and can be stored across multiple worksheets. In various embodiments, the data can be retrieved from one or more databases in addition to (or instead of) spreadsheet documents.

FIGS. 9A-9K are user interface diagrams illustrating a user interface provided by the technology in various embodiments.

Figure 9A:
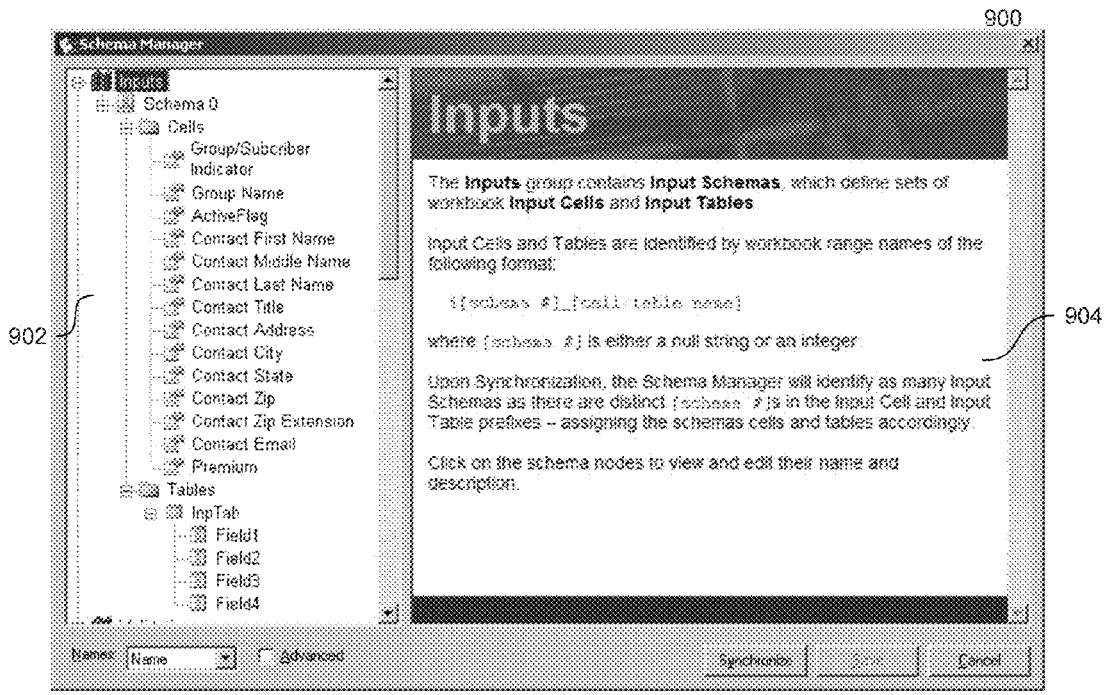
FIGS. 9A-9K are user interface diagrams illustrating a user interface provided by the technology in various embodiments.

In FIG. 9A, a user interface 900 includes a navigation region 902 and a content region 904. A user (e.g., an information technology professional) can select an element in the navigation region 902, and the technology can alter the content region 904 to contain information pertinent to the selected element in the navigation region 902. The navigation region 902 can be populated by the technology after the technology evaluates an input spreadsheet document (or other type of document that can provide input data). As an example, the navigation region 902 can provide a tree view of input data, e.g., based on an analysis of metadata, named cells or ranges, etc.

Figure 9B:
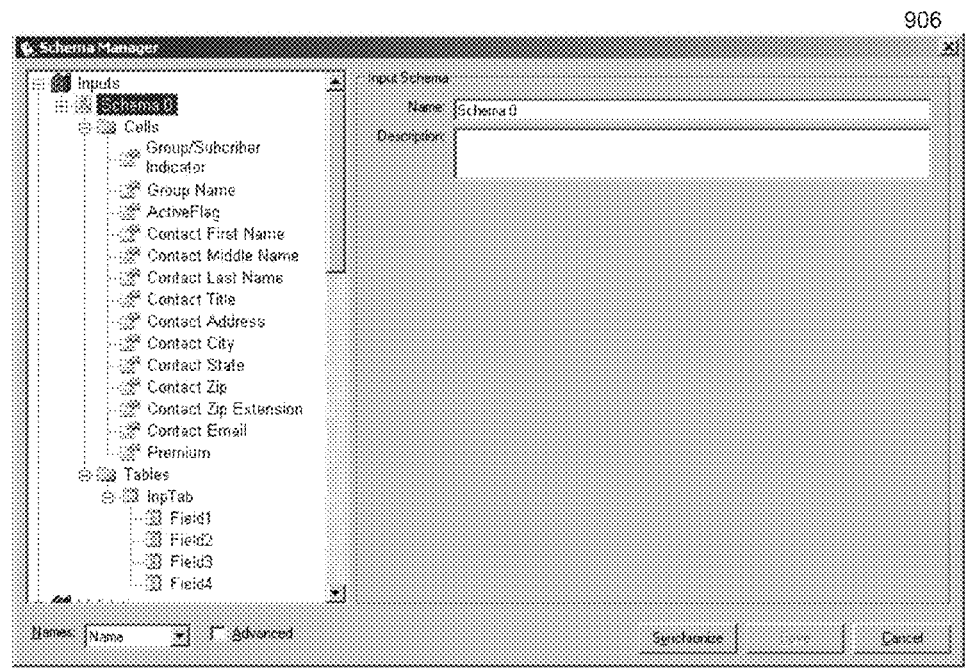
Figure 9C:
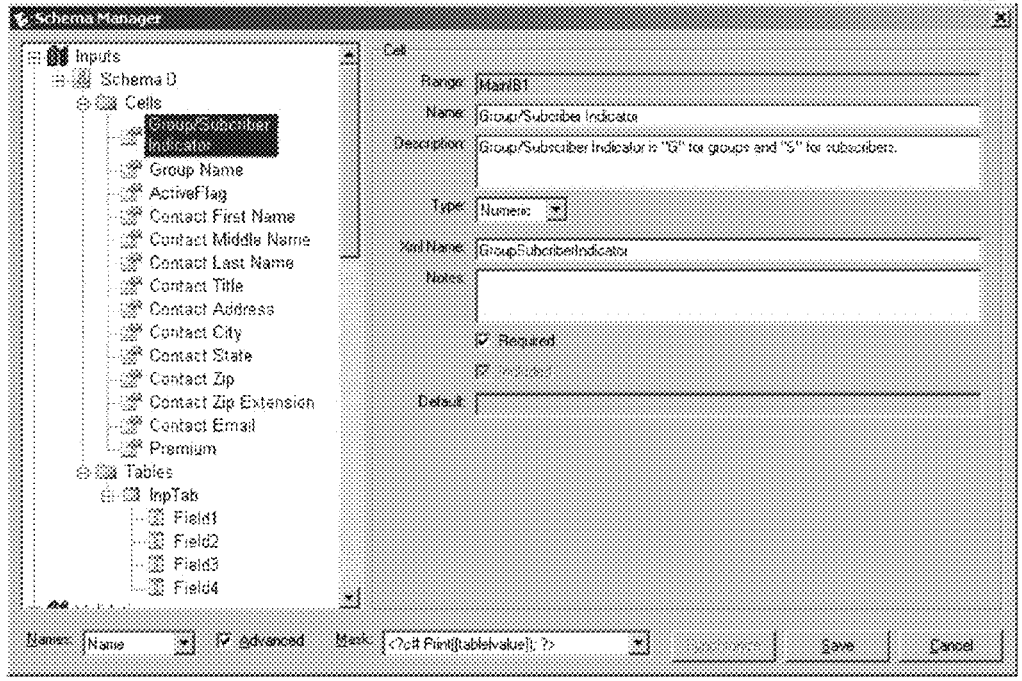
Figure 9D:
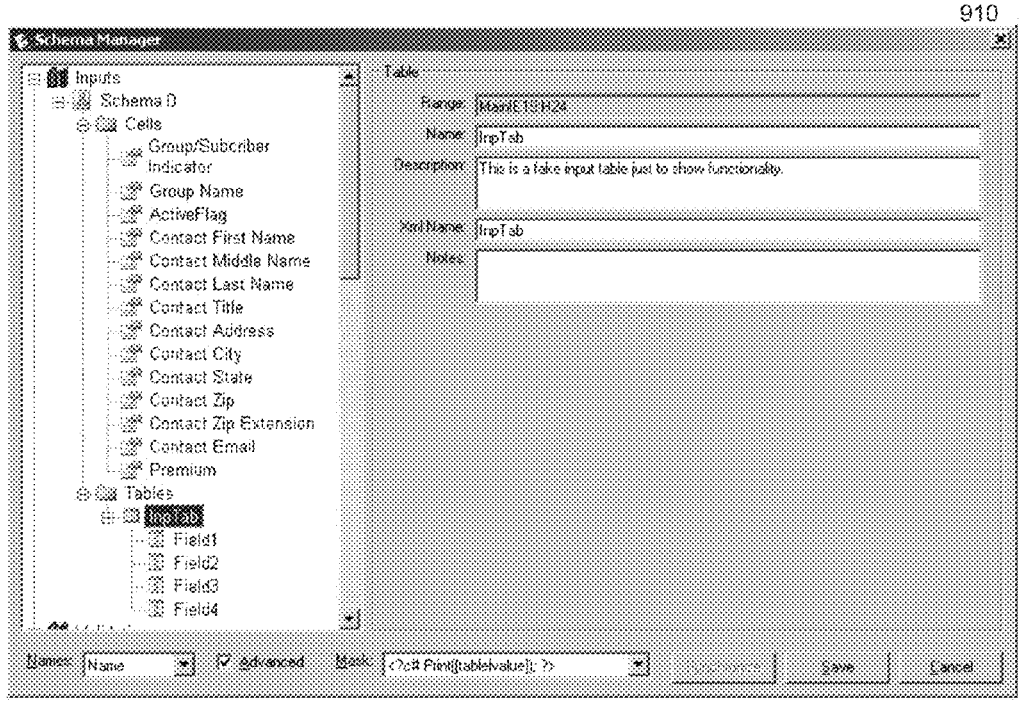
Figure 9E:
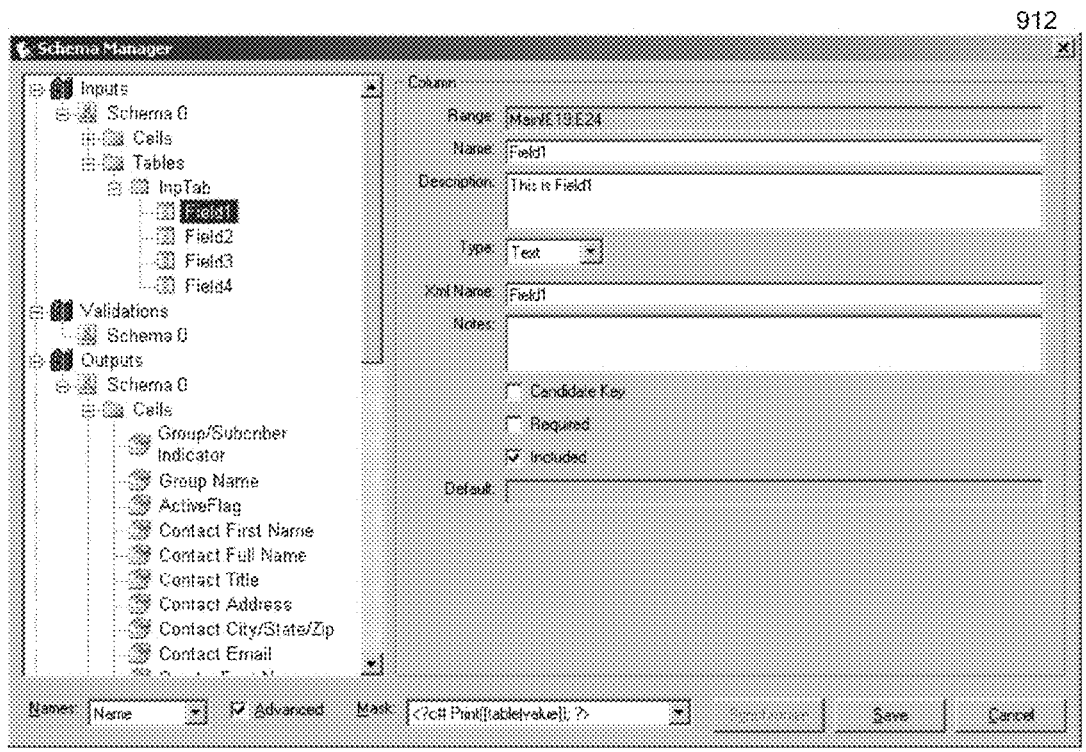

In user interface 906 of FIG. 9B, the user has selected a schema element. In user interface 908 of FIG. 9C, the user has selected a cell. The user can change various attributes associated with the cell, as illustrated in the content region. FIGS. 9D-9K illustrate selection of other elements in the navigation region 902, e.g., tables, output schemas, validation schemas, main charts, etc.

Figure 9F:
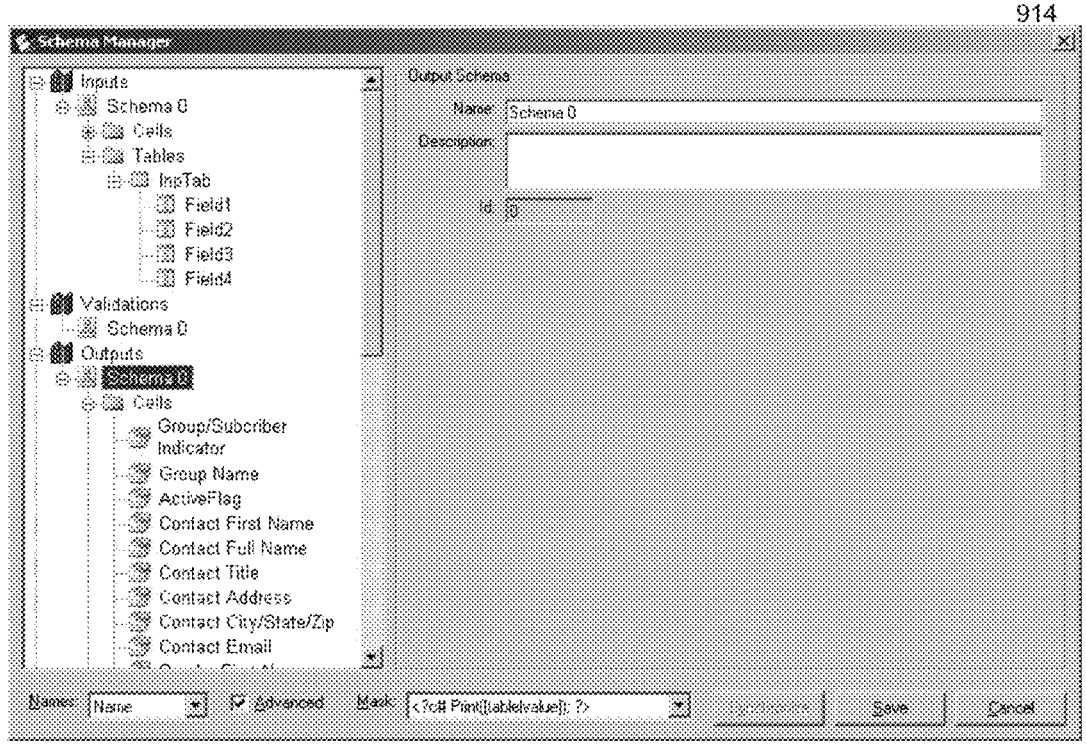
Figure 9G:
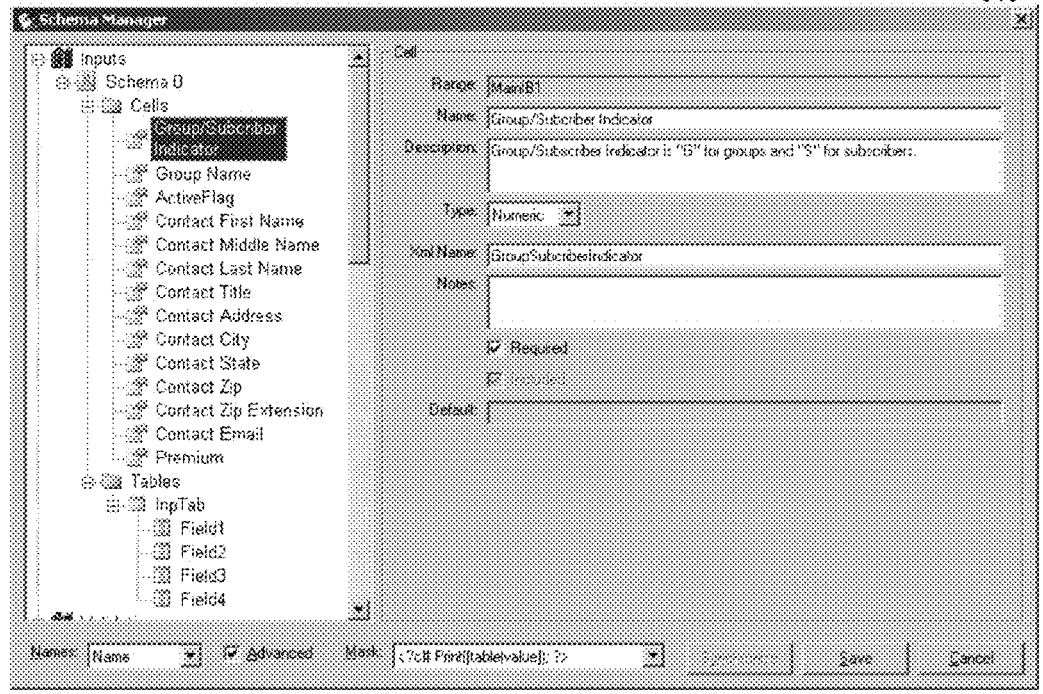
Figure 9H:
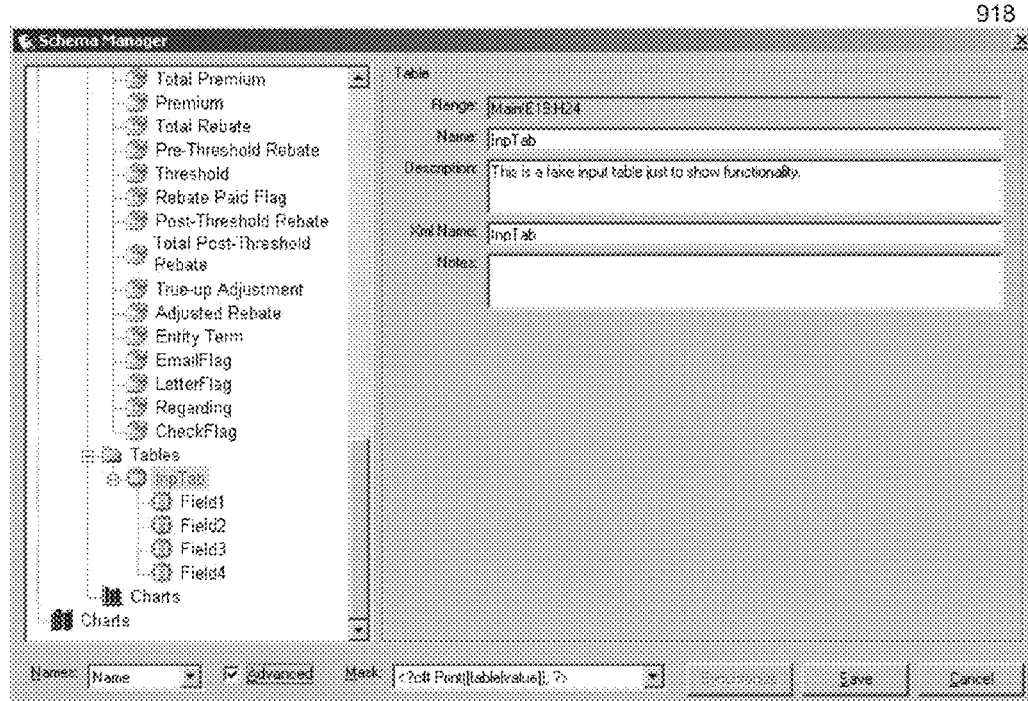
Figure 9I:
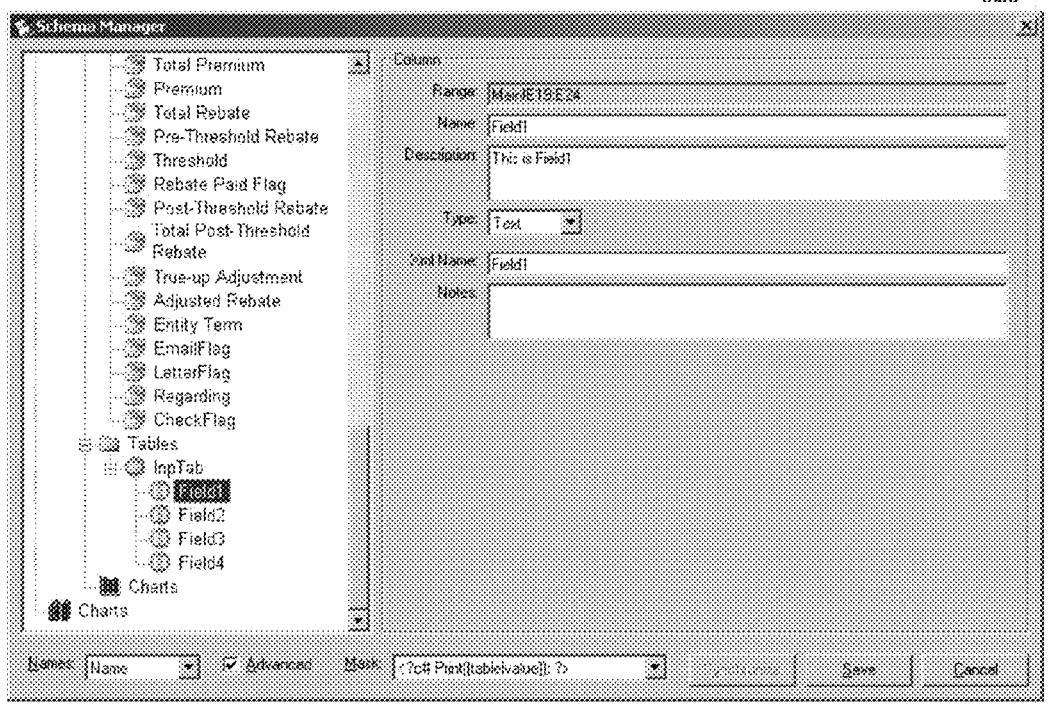
Figure 9J:
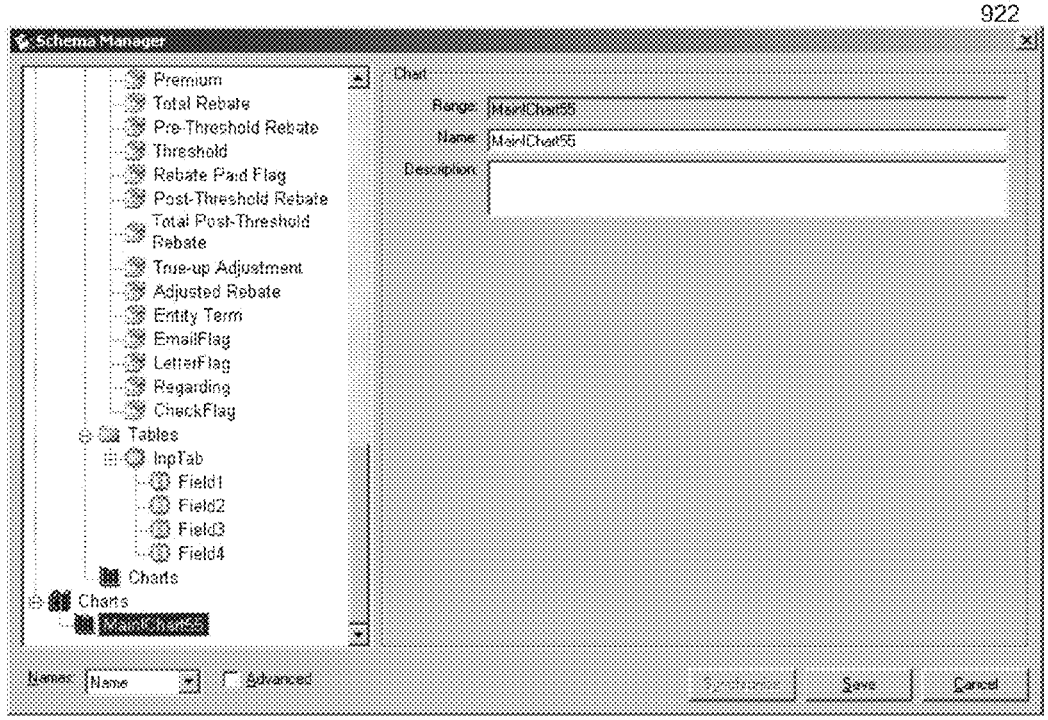
Figure 9K:
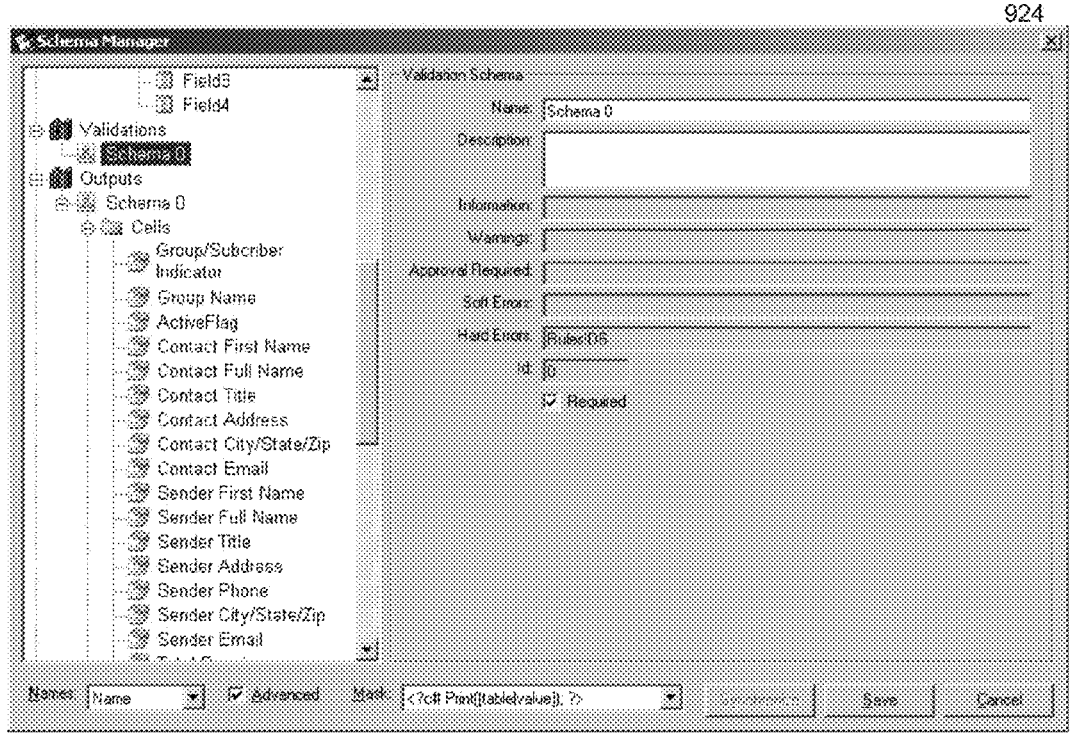

As previously described, an information technology professional can insert source code (e.g., script) into a wordprocessing document, e.g., to add data from a spreadsheet document. The technology enables a the information technology professional to drag and drop to add the code automatically. As an example, FIG. 9F illustrates an expanded output schema and, near the bottom of the figure, a mask. The information technology professional can select an output schema element (e.g., a cell reference, a table reference, or a chart reference) and "drag and drop" the element into a wordprocessing document. The technology evaluates a mask (e.g., "<?c# if ([value]==[arg]) {} ?>") and emits corresponding code (e.g., "<?"<?c# if (Cell("PlanType")=="") ?>"). By enabling dragging and dropping, the technology can reduce errors associated with computer programming, e.g., caused by incorrect spelling, etc. A mask provides a template for output code that can be evaluated, e.g., when generating source code.

FIG. 10 is an output diagram illustrating an example of output emitted by the technology in some embodiments. The output illustrates a statement and a check.

FIG. 11 is an input diagram illustrating an example of a portion of a wordprocessing document that the technology may receive to emit the output illustrated in FIG. 10. The input wordprocessing document includes static information (e.g., tables, headings, and some text) and dynamic information that provides commands ("instructions") that refer to input values, e.g., identified as named cells or ranges in a spreadsheet document. The commands or instructions can also specify functions, operators for calculations or comparisons, etc. In various embodiments, the instructions or commands can be specified inside script tags, e.g., a <?c# ?> tag. Other languages may employ other tags. As would be recognized by one skilled in the art, the tags specify instructions that are to be executed including, e.g., operators, conditionals, etc., and can refer to schemas in another document, e.g., a spreadsheet document. When the technology emits source code (or object code) corresponding to the spreadsheet document and/or the wordprocessing document, the code in these tags may be directly included in the emitted code.

In various embodiments, the technology can be adapted for use in various environments, e.g., healthcare explanation of benefits, financial reports, etc. Although the technology is described with reference to portions of various types of documents (e.g., cells in spreadsheet documents), the technology can work with other portions of similar or different documents (e.g., worksheets, workbooks, text files with tables, etc.).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computing device, comprising:
   receiving a spreadsheet document, the spreadsheet document identifying at least one named cell or region;
   receiving a wordprocessing document, wherein the wordprocessing document is at least one of a letter, an e-mail, a bank check, an instruction manual or other wordprocessing document, the wordprocessing document including a script tag and an instruction within the script tag, the instruction identifying the at least one named cell or region;
   producing a first source code corresponding to the received spreadsheet document;
   producing a second source code corresponding to the received wordprocessing document, wherein the second source code corresponding to the received wordprocessing document includes a functional link to the at least one named cell or region of the spreadsheet document;
   combining the first source code and the second source code into a combined code;
   identifying duplicate commands in the combined code; and
   parameterizing the duplicate commands from the combined code to eliminate duplication, wherein the parameterization includes generating formula signatures cells and reducing size of the combined code based on occurrence frequency of each formula signature.

2. The method of claim 1, further comprising parsing the wordprocessing document to identify script tags and static portions.

3. The method of claim 1, wherein the first and second source codes are specified in a C# computer programming language.

4. The method of claim 3, further comprising emitting an intermediate language code library.

5. The method of claim 1, further comprising submitting a schema when executing object code corresponding to the produced first and second source codes.

6. The method of claim 1, further comprising generating a code library.

7. The method of claim 6, further comprising invoking a function of the code library from a hosting application.

8. The method of claim 7, wherein the hosting application provides a transactional interface.

9. The method of claim 7, wherein the hosting application provides a batch process interface.

10. The method of claim 1, wherein output from the first and second source codes is a generated document.

11. The method of claim 10, wherein the generated document is in a portable document format ("PDF").

12. The method of claim 10, wherein the generated document is a native wordprocessing document.

13. A computer-readable storage device storing non-transitory computer-executable instructions, the instructions comprising:
    receiving a wordprocessing document, wherein the wordprocessing document is at least one of a letter, an e-mail, a bank check, an instruction manual or other wordprocessing document, the wordprocessing document including a script tag and an instruction within the script tag, the instruction identifying the at least one named cell or region of a spreadsheet document;
    producing a first source code corresponding to the spreadsheet document;
    producing a second source code corresponding to the received wordprocessing document, wherein the second source code corresponding to the received wordprocessing document includes a functional link to the at least one named cell or region of the spreadsheet document;
    combining the first source code and the second source code into a combined code;
    identifying duplicate commands in the combined code; and
    parameterizing the duplicate commands from the combined code to eliminate duplication, wherein the parameterization includes generating formula signatures cells and reducing size of the combined code based on occurrence frequency of each formula signature.

14. The computer-readable storage device of claim 13, further comprising instructions for generating a code library corresponding to the produced source code.

15. The computer-readable storage device of claim 14, wherein the code library is a C# assembly.

16. The computer-readable storage device of claim 14, wherein functions in the generated code library reference functions in a static library.

17. A system, comprising:
    a component configured to receive a wordprocessing document, wherein the wordprocessing document is at least one of a letter, an e-mail, a bank check, an instruction manual or other wordprocessing document, the wordprocessing document including a script tag and an instruction within the script tag, the instruction identifying at least the one named cell or region of a spreadsheet document;
    a processor configured to:
      produce a first source code corresponding to the received spreadsheet document;
      produce a second source code corresponding to the received wordprocessing document, wherein the second source code corresponding to the received wordprocessing document includes a functional link to the at least one named cell or region of the spreadsheet document;
      combine the first source code and the second source code into a combined code;
      identify duplicate commands in the combined code; and
      parameterize the duplicate commands from the combined code to eliminate duplication, wherein the parameterization includes generating formula signatures cells and reducing size of the combined code based on occurrence frequency of each formula signature.

18. The system of claim 17, further comprising a static library.

19. The system of claim 17, further comprising a spreadsheet tool, a wordprocessing tool, and a business content server.

* * * * *

UNITED STATES PATENT AND TRADEMARK OFFICE
CERTIFICATE OF CORRECTION

| | | |
|---|---|---|
| PATENT NO. | : 9,141,393 B2 | Page 1 of 1 |
| APPLICATION NO. | : 13/299259 | |
| DATED | : September 22, 2015 | |
| INVENTOR(S) | : Kraft et al. | |

It is certified that error appears in the above-identified patent and that said Letters Patent is hereby corrected as shown below:

In the specification

Column 7, line 53, delete "dependences" and insert -- dependencies --, therefor.

Column 10, line 26, after "enables a" delete "the".

Column 10, line 35, delete """) ?>")." and insert -- "") {}?>"). --, therefor.

Signed and Sealed this
Twenty-second Day of March, 2016

Michelle K. Lee
*Director of the United States Patent and Trademark Office*